United States Patent
Ren et al.

(10) Patent No.: US 10,417,486 B2
(45) Date of Patent: Sep. 17, 2019

(54) DRIVER BEHAVIOR MONITORING SYSTEMS AND METHODS FOR DRIVER BEHAVIOR MONITORING

(71) Applicant: Alcatel-Lucent USA Inc., Murray Hill, NJ (US)

(72) Inventors: Yansong Ren, Plano, TX (US); Lawrence O'Gorman, Madison, NJ (US); Thomas L. Wood, Colts Neck, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 321 days.

(21) Appl. No.: 14/143,376

(22) Filed: Dec. 30, 2013

(65) Prior Publication Data

US 2015/0186714 A1    Jul. 2, 2015

(51) Int. Cl.
   G06K 9/00      (2006.01)
   B60W 40/09     (2012.01)
   H04N 5/232     (2006.01)
   H04N 7/18      (2006.01)

(52) U.S. Cl.
   CPC ......... *G06K 9/00369* (2013.01); *B60W 40/09* (2013.01); *G06K 9/00845* (2013.01); *H04N 5/23229* (2013.01); *H04N 7/183* (2013.01)

(58) Field of Classification Search
   None
   See application file for complete search history.

(56) References Cited

U.S. PATENT DOCUMENTS

| 6,496,117 | B2  |   | 12/2002 | Gutta et al. |   |
|-----------|-----|---|---------|--------------|---|
| 6,974,414 | B2  |   | 12/2005 | Victor       |   |
| 7,460,940 | B2  |   | 12/2008 | Larsson et al. | |
| 7,839,292 | B2  |   | 11/2010 | Wang et al.  |   |
| 8,731,530 | B1  | * | 5/2014  | Breed ............... | H04M 1/72577 |
|           |     |   |         |              | 455/414.1 |
| 2005/0073136 | A1 | * | 4/2005 | Larsson ................. | A61B 3/113 |
|           |     |   |         |              | 280/735 |

(Continued)

FOREIGN PATENT DOCUMENTS

JP    07-057172    3/1995
JP    10-256979    9/1998

(Continued)

OTHER PUBLICATIONS

Sigari, et al., A Driver Face Monitoring System for Fatigue and Distraction Detection, Research Article, International Journal of Vehicular Tecnology, 2013.

(Continued)

*Primary Examiner* — Edemio Navas, Jr.
(74) *Attorney, Agent, or Firm* — Harness, Dickey, & Pierce, P.L.C.

(57) ABSTRACT

A driver behavior monitoring system includes: a video camera; an image processing system; and a driver alert system. The video camera records the driver's behavior, and the image processing system analyzes the recorded video content to recognize and classify the driver's behavior as at least one of: (i) distracted behavior; and (ii) accident behavior. Based on the recognition and classification, the driver alert system may perform various operations such as alerting the driver, alerting the authorities, etc.

18 Claims, 4 Drawing Sheets

(56) References Cited

U.S. PATENT DOCUMENTS

| | | | | |
|---|---|---|---|---|
| 2010/0033333 | A1* | 2/2010 | Victor | A61B 3/113 340/576 |
| 2010/0241021 | A1* | 9/2010 | Morikawa | A61B 5/048 600/544 |
| 2012/0212353 | A1* | 8/2012 | Fung | B60K 28/06 340/905 |
| 2012/0242819 | A1 | 9/2012 | Schamp | |
| 2013/0070043 | A1* | 3/2013 | Geva | B60K 28/066 348/14.02 |

FOREIGN PATENT DOCUMENTS

| | | |
|---|---|---|
| JP | 2000-198370 A | 7/2000 |
| JP | 2002-64852 A | 2/2002 |
| JP | 2010036762 A | 2/2010 |
| JP | 2010152487 A | 7/2010 |

OTHER PUBLICATIONS

Ohn-Bar, et al., "Driver hand activity analysis in naturalistic driving studies: challenges, algorithms, and experimental studies", Journal of Electronic Imaging, vol. 22, No. 4, Oct. 21, 2013.

McCall, et al., "Driver Monitoring for a Human-Centered Driver Assistance System", Proceedings of the 1st ACM International Workshop on Human-Centered Multimedia, HCM '06, Oct. 27, 2006, pp. 115-121.

Veeraraghavan, et al., "Classifiers for driver activity monitoring", Transportation Research, Part C, Emerging Technologies, vol. 15, No. 1, Mar. 23, 2007, pp. 51-67, available online at www.sciencedirect.com.

Bergasa, et al., "Analysing Driver's Attention Level using Computer Vision", Intelligent Transportation Systems, 2008, 11th International IEEE Conference, Oct. 12-15, 2008, pp. 1149-1154.

International Search Report and Written Opinion issued in International Application No. PCT/US2014/066271, dated Mar. 5, 2015.

International Preliminary Report on Patentability dated Jul. 5, 2016 for PCT/US2014/066271.

Examiner's Decision of Rejection dated Feb. 26, 2019 issued in Japanese Application No. 2016-543608.

Decision of Dismissal of Amendment dated Feb. 26, 2019 issued in Japanese Application No. 2016-543608.

European Communication pursuant to Article 94(3) EPC dated Jul. 22, 2019 issued in European Application No. 14 814 720.0-1207.

* cited by examiner

DRIVER BEHAVIOR MONITORING SYSTEMS AND METHODS FOR DRIVER BEHAVIOR MONITORING

BACKGROUND

In recent years, distracted driving has become a leading factor in many vehicle crashes. There are many driver distractions, including changing the radio, observing an event outside the vehicle, using an electronic device, etc. Among these distractions, cellphone use and texting are two of the most common distractions. Even though many states ban the use of handheld cellphones while driving and also restrict the use of all electronic devices by novice and school bus drivers, it is difficult for police officers to enforce the laws due to the lack of resources to monitor drivers' behavior. Moreover, because laws can differ substantially in different areas, it is difficult for people to realize that they are in a location in which a particular behavior is restricted by law.

Furthermore, when an accident occurs at night or during the day with low visibility, resulting pileup accidents may occur. Conventional accident reporting systems within vehicles are based on actions taken by a vehicle (e.g., deployment of an airbag). However, these actions are taken in response to an accident, and the accident is not reported rapidly enough to help prevent further accidents (e.g., resulting pileup accidents).

SUMMARY

Example embodiments provide driver behavior monitoring systems and methods capable of detecting abnormal behavior (e.g., distracted and/or accident) by the driver. Driver behavior analysis results may be combined with other vehicle sensor information (e.g., engine information, speed sensors, location information, etc.) to determine the occurrence and location of an accident. The system may report an accident to authorities, emergency responders or the other drivers nearby by leveraging global positioning system (GPS) information and/or wireless multicasting techniques based on the location of the car. The system may provide the ability to both automatically report an accident and to suppress the occurrence further pileup accidents by alerting nearby drivers.

At least one example embodiment provides a driver behavior monitoring system including: a frame sampling circuit configured to generate a set of representative image frames by sampling driver behavior video content; a feature identification circuit configured to generate a vector representation of a foreground portion of each representative image frame in the set of representative image frames, the foreground portion including features relevant for recognizing and classifying driver behavior as distracted or accident behavior; and a recognition and classification circuit configured to generate, based on the vector representations, a set of decision rules for recognizing and classifying the driver behavior as distracted or accident behavior, each of the decision rules corresponding to a different concept, movement or action associated with the distracted or accident behavior.

At least one other example embodiment provides a method for monitoring driver behavior, the method including: generating a set of representative image frames by sampling driver behavior video content; generating a vector representation of a foreground portion of each representative image frame in the set of representative image frames, the foreground portion including features relevant for recognizing and classifying driver behavior as at least one of distracted and accident behavior; generating, based on the vector representations, a set of decision rules for recognizing and classifying the driver behavior as distracted or accident behavior, each of the decision rules corresponding to a different concept, movement or action associated with the distracted or accident behavior; and storing the generated set of decision rules in a memory.

At least one other example embodiment provides a driver behavior monitoring system including: a frame sampling circuit configured to generate a set of representative image frames by sampling driver behavior video content; a feature identification circuit configured to generate a vector representation of a foreground portion of each representative image frame in the set of representative image frames, the foreground portion including features relevant for recognizing and classifying driver behavior as distracted or accident behavior; a recognition and classification circuit configured to recognize and classify the driver behavior based on the vector representations and a set of decision rules for recognizing and classifying the driver behavior, each of the decision rules corresponding to a different concept, movement or action associated with the distracted or accident behavior, the recognition and classification circuit being further configured to output a notification signal corresponding to the recognized and classified driver behavior; and a driver alert system configured to selectively alert a driver of a vehicle in response to the notification signal.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
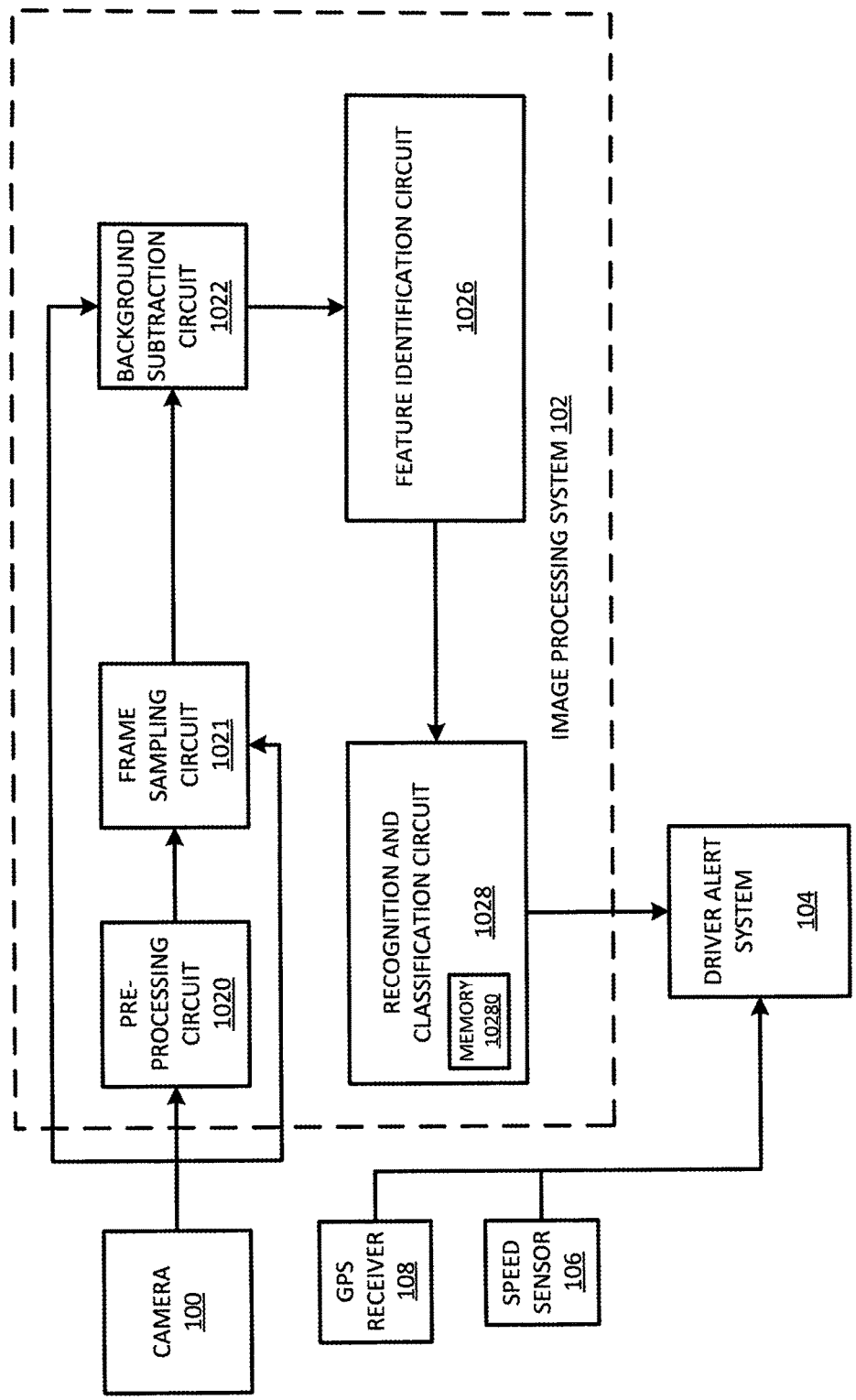
FIG. 1 illustrates a driver behavior monitoring system according to an example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using hardware such as one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments provide driver behavior monitoring systems and methods of monitoring driver behavior operating the same.

According to at least one example embodiment, a driver behavior monitoring system includes: a video camera; an image processing system; and a driver alert system. The driver behavior monitoring system may further include a global positioning system (GPS) receiver and a speed sensor.

The video camera records the driver's behavior, and the image processing system analyzes the recorded video content to recognize and classify the driver's behavior as one of: (i) distracted behavior; and (ii) accident behavior. Based on the classification of the video content, the driver alert system may perform various operations such as alerting the driver, alerting the authorities, etc.

According to at least some example embodiments, distracted behavior may include, for example: use of cellphone while driving; texting while driving; head not facing front while driving forward; etc. Accident behavior may include: head impacting door; head impacting steering wheel; driver sleeping; airbag inflation; etc.

FIG. 1 illustrates an example embodiment of a driver behavior monitoring system.

Referring to FIG. 1, the driver behavior monitoring system includes: a camera (e.g., a video camera) 100; an image processing system 102; a global positioning system (GPS) receiver 108; a speed sensor 106; and a driver alert system 104. Each of these components will be discussed in more detail below.

The camera 100 is mounted in a vehicle so as to capture video content and/or images of driver behavior, including movement of the arm, hand and head positions of the driver. The camera 100 may be positioned to face the driver either head-on or at an angle relative to the driver. In one example, the camera 100 may be attached to an interior of a vehicle facing the driver. In another example, the camera 100 may be attached or mounted to the rear-view mirror of the vehicle. The camera 100 captures/obtains videos of the driver and the background of the vehicle behind the driver. According to at least some example embodiments, the camera 100 may be a video camera configured to capture video frames at a certain frequency.

Figure 4:
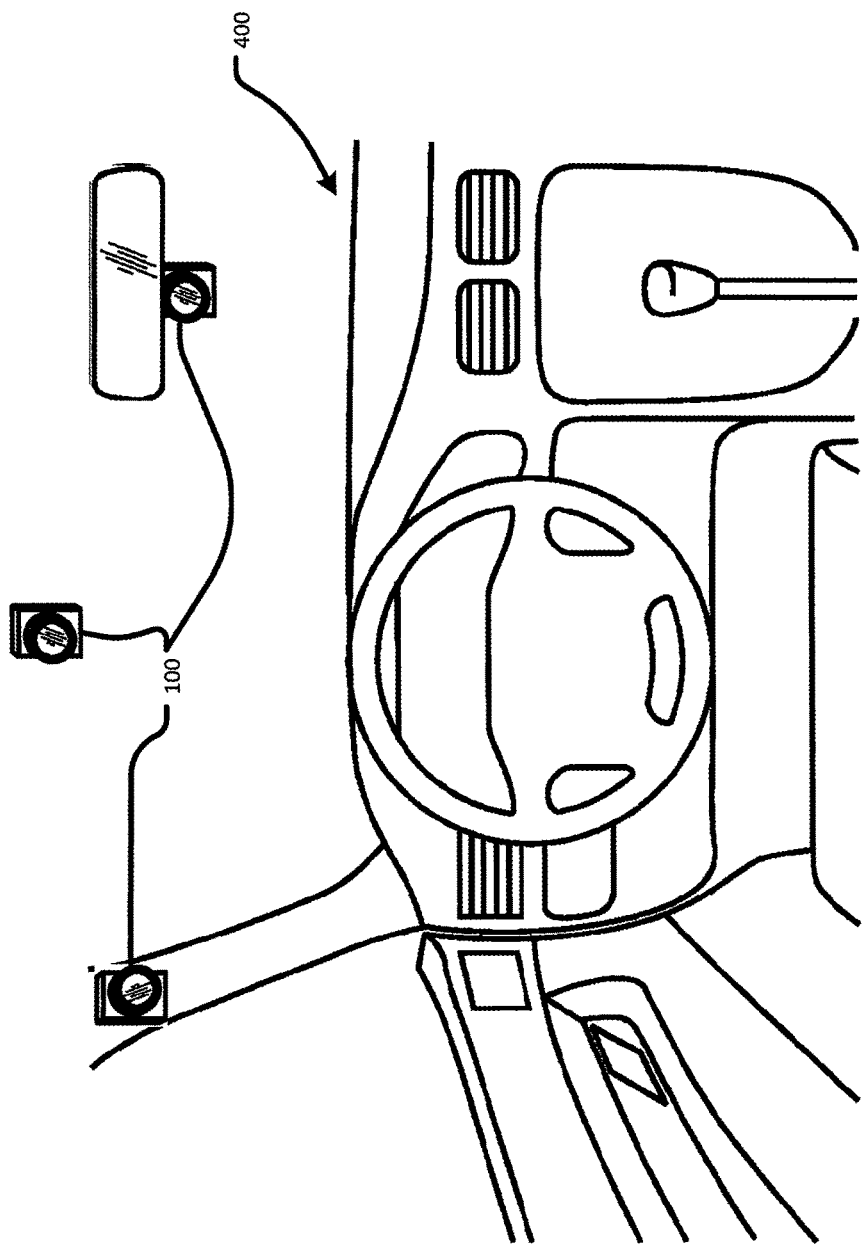
FIG. 4 illustrates example positions for the video camera shown in FIG. 1.

FIG. 4 illustrates example positions for the video camera 100 shown in FIG. 1. As shown in FIG. 4, the video camera 100 may be mounted to the roof of a vehicle 400 so as to face the driver head-on, mounted to the rear-view mirror to face the driver at an angle, or the interior of the driver-side door to face the driver at an angle. The positions of the video camera 100 shown in FIG. 4 are only examples, and it should be understood that the video camera 100 may be arranged at any suitable position.

The image processing system 102 analyzes driver behavior video content and to generate driver behavior classifiers usable to detect distracted and/or accident behavior by a driver at driving time. The image processing system 102 detects distracted and/or accident behavior at driving time, and outputs the detected result to the driver alert system 104 (e.g., in the form of a notification signal). The driver alert system 104 outputs an alert if necessary in response to the detected result.

As shown in FIG. 1, the image processing system 102 includes: a pre-processing circuit 1020; a frame sampling circuit 1021; a background subtraction circuit 1022; a feature identification circuit 1026; and a recognition and classification circuit 1028. The recognition and classification circuit 1028 includes a memory 10280. The image processing system 102 including each of these components and their functionality will be discussed in more detail later with regard to FIGS. 2 and 3.

The driver alert system 104 outputs an alert based on the recognition result from the image processing system 102. In one example, the driver alert system 104 may output an audible and/or visual alert when the image processing system 102 detects distracted or accident behavior. In another example, the driver alert system 104 may alert the necessary authorities and/or emergency services (e.g., police, fire, emergency medical system (EMS), etc.) if accident behavior is detected.

Still referring to FIG. 1, the GPS receiver 108 tracks the location of the vehicle, and outputs location information (e.g., including longitude/latitude, intersection, address, street/road, mile marker, etc.) to the image processing system 102 and the driver alert system 104. Because GPS receivers are well-known, a further discussion is omitted for the sake of brevity.

The speed sensor 106 tracks the moving speed of the vehicle at any moment in time. The speed sensor 106 outputs speed information to the driver alert system 104. In one example, the speed sensor 106 may be the speedometer of the vehicle in which the driver behavior monitoring system is installed. In another example, the speed sensor 106 may independently calculate the speed of the vehicle based on GPS information from the GPS receiver 108. Because speed sensors such as these are well-known, a more detailed discussion is omitted.

According to at least one example embodiment, the driver behavior monitoring system is trained to recognize different types of driver behavior. According to at least one other example embodiment, the driver behavior monitoring system recognizes driver behavior, and outputs alerts as necessary.

Figure 2:
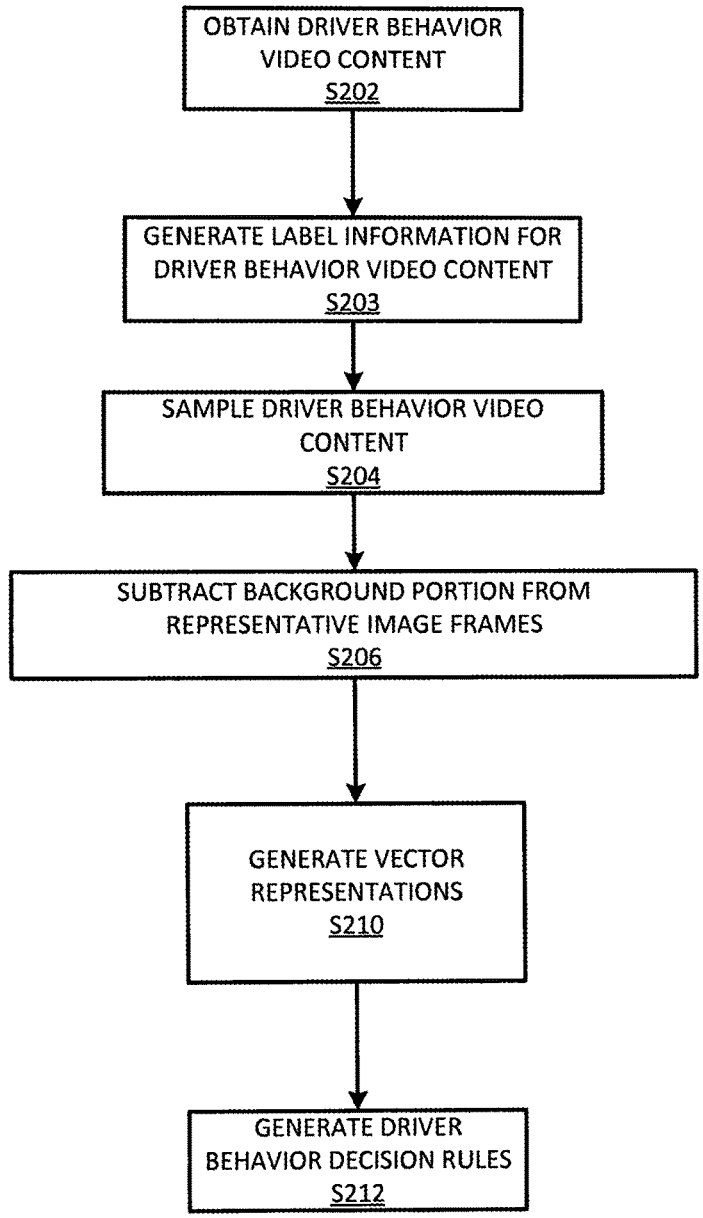
FIG. 2 is a flow chart illustrating an example embodiment of a method for training a driver behavior monitoring system.

FIG. 2 is a flow chart illustrating an example embodiment of a method for training a driver behavior monitoring system to detect driver behavior. The method shown in FIG. 2 will be described with regard to the driver behavior monitoring system shown in FIG. 1.

Referring to FIGS. 1 and 2, at step S202 the camera 100 obtains driver behavior video content associated with a given driver behavior. The camera 100 outputs the obtained driver behavior video content to the image processing system 102.

In this example, the driver behavior video content includes at least one driver behavior training video. Although discussed with regard to a single driver behavior training video, the driver behavior video content for a given driver behavior may include any number of driver behavior training videos acquired over any period of time, and including any number of different drivers of different vehicles.

In one example, the driver behavior video content includes the arm, hand and head positions, movements associated with these extremities, and objects relevant to the given driver behavior (e.g., a cellphone, a water bottle, etc.).

At step S203, the pre-processing circuit 1020 generates label information for the driver behavior video content obtained by the camera 100. In one example, the label information for the driver behavior video content may include a starting frame identifier and an ending frame identifier for the given driver behavior as well as a label identifying the driver behavior captured in the video. The label for the driver behavior and/or the frame identification information may be entered by a human operator.

In another example embodiment, the pre-processing circuit 1020 may generate the label information using a relatively small number of labeled images of the driver containing a body pose associated with the given driver behavior. Action categories may be learned or obtained from those static images by studying the trend of changes in body pose to extrapolate the images before and/or after the labeled static images. For example, if a frame shows the driver holding a cellphone to his/her ear and is identified as such (e.g., by a human operator), then the pre-processing circuit 1020 may leverage existing object recognition algorithms to identify a cellphone and body pose recognition algorithms to find the hand and head position. Since this image frame is informative, the image frame is selected as a representative image for training the behavior of using a cellphone. Due to the continuation of the behavior, the frames before and after the selected frame, containing the driver's actions of picking up and putting down the cellphone, can be automatically labeled as related to the calling behavior.

Returning to FIG. 2, the pre-processing circuit 1020 appends the generated label information to the driver behavior video content for the given driver behavior, and outputs the driver behavior video content along with the label information to the frame sampling circuit 1021.

At step S204, the frame sampling circuit 1021 samples the driver behavior video content to obtain a set of representative image frames for the given driver behavior video content. In one example, the frame sampling circuit 1021 may sample 1 frame in every 5 consecutive frames of the driver behavior video content. The frame sampling circuit 1021 outputs the set of representative image frames to the background subtraction circuit 1022.

At step S206, the background subtraction circuit 1022 subtracts the background portion from each representative image frame to generate a set of representative foreground images for the given driver behavior. A representative foreground image may also be referred to as the foreground portion of a representative image frame.

In this example, a representative foreground image refers to the portion of the representative image frame including the driver's body pose and objects relevant to the given driver behavior (e.g., a cellphone, a water bottle, etc.). In other words, the representative foreground image includes information relevant to detecting and/or recognizing a given driver behavior, including at least one of distracted and accident behavior. The background portion of a representative image frame refers to the remaining portions of the representative image frame.

In one example, the background subtraction circuit 1022 utilizes a recorded background (e.g., static) image or images of the car's internal structure (e.g., including the location and shape of door, window, steering wheel, internal texture, color, etc.) obtained by the camera 100 to identify the background portion of a given representative image frame. As discussed herein the recorded background image or images may also be referred to as reference background image or images. The background subtraction circuit 1022 performs background subtraction to remove the background portion from each representative image frame.

In another example, the background subtraction circuit 1022 separates the foreground portion from the background portion of a representative image frame using frame differencing between the reference background image and the representative image frame. In this example, the reference background image is represented as a grayscale image. The background subtraction circuit 1022 converts each representative image frame into a grayscale image, and the difference in each pixel's intensity value represents changes between the compared two images. The foreground portion shows greater changes in the difference in the pixel's intensity value, whereas pixel intensity values similar to the reference background image show lesser changes.

The background subtraction circuit 1022 outputs the set of representative foreground images to the feature identification circuit 1026.

At step S210, the feature identification circuit 1026 generates a vector representation of each representative foreground image in the set of representative foreground images. In one example, the feature identification circuit 1026 generates the vector representations of the representative foreground images using a Bag-of-Features (BOF) approach. As is known, according to the BOF methodology each representative foreground image is converted into a global histogram of visual word occurrences where each "visual word" is a quantized local feature descriptor describing a visual feature in the representative foreground image. Although example embodiments will be discussed with regard to the BOF methodology, it should be understood that example embodiments are not limited to only this example implementation.

Moreover, although example embodiments may be discussed with regard to a specific histogram example, the feature descriptors describing the visual features may depend on the particular technique used to describe the features, for instance the ORB descriptor is a binary string, SIFT/SURF descriptor is a vector of integers and STIP descriptor is a vector of HOG and HOF.

For the sake of simplicity, the generation of the vector representation will be discussed with regard to a single representative foreground image. However, it should be understood that the same or substantially the same process is performed for each representative foreground image in the set of representative foreground images to generate a vector representation for the given driver behavior.

Still referring to step S210 in FIG. 2, the feature identification circuit 1026 performs feature detection of the representative foreground image. In so doing, the feature identification circuit 1026 determines whether there is an image feature present at each point or pixel of the representative foreground image. As is known, an image feature is essentially an "interesting" part of an image; that is, a pixel of an image at which an object may be present. Types of image features include edges, corners/interest points, blobs, ridges, etc. The feature identification circuit 1026 identifies those pixels at which an image feature is present as key or interesting pixels within the representative foreground image.

In one example, the feature identification circuit 1026 may detect features in the representative foreground image using well-known local feature detectors such as, Features from Accelerated Segment Test (FAST), Oriented FAST and Rotated BRIEF (ORB), Speeded Up Robust Features (SURF), Scale-Invariant Feature Transformation (SIFT), etc.

As is known, SIFT performs reliable feature recognition to detect object under changes in scale, noise and illumination. Inspired by SIFT, SURF is based on the sums of 2D Haar wavelet responses and makes an efficient use of integral images. FAST uses machine learning for high-speed corner detection. ORB is based on the FAST feature detectors and uses a binary descriptor to represent the detected features.

After performing feature detection, for each detected feature the feature identification circuit 1026 extracts a local image patch around and including the detected feature pixel. The feature identification circuit 1026 then generates a feature descriptor representing the local image patch as a vector. The feature identification circuit 1026 may compute feature descriptors using techniques, such as those discussed above (e.g., a histogram of oriented gradient (HOG), a histogram of optical flow (HOF) features, etc.). In one example, normalized histograms are concatenated into HOG and HOF descriptor vectors.

The detected features in the representative foreground images capture both the spatial and temporal characteristics of the driver's movement around space and time salient features. Consequently, the detected features in the representative foreground images contain both static and motion (or dynamic) features. The static features in each individual representative foreground image have spatial characteristics of the driver's body pose (e.g., the driver's hand and its position, the driver's head and its position, etc.) and/or objects (e.g., a cellphone, a water bottle, etc.).

The spatial and temporal characteristics enable the feature identification circuit 1026 to detect movement of objects and/or the driver across the representative foreground images. In one example, the feature identification circuit 1026 identifies dynamic action (or motion) features in the representative foreground images by tracking the position of detected static features between representative foreground images (e.g., from one representative to a subsequent representative foreground image) in the set. In one example, the feature identification circuit 1026 may identify dynamic features and generate feature descriptors representing these dynamic features using optical flow approaches or using spatio-temporal feature descriptors, such as Space-Time Interest Points (STIP), which is well-known in the art.

The feature identification circuit 1026 maps the generated feature descriptors to visual words, where each visual word represents similar local image patches across the representative foreground images. In this context, as mentioned above, each "visual word" refers to a quantized local feature descriptor describing a feature of an image. The feature descriptors may be mapped to visual words using various clustering algorithms, such as k-means, hierarchical k-means, and approximate k-means. The set of all possible visual words corresponding to the feature descriptors is referred to as a visual vocabulary. Thus, according to at least this example embodiment, the visual vocabulary includes both dynamic action features and static features and is be learned via various clustering algorithms, such as k-means, hierarchical k-means, and approximate k-means. The visual vocabulary is later used for quantizing local features. A vector quantizer takes a feature vector and maps the feature to the index of the nearest visual word in the visual vocabulary.

Once having built the visual vocabulary, the feature identification circuit 1026 generates a vector representation of the representative foreground image in the form of a global histogram of visual word occurrences in the representative foreground image. In one example, the vector representation(s) correspond to different driver movement(s), such as picking a phone, holding the phone, looking sideways, etc.

The feature identification circuit 1026 outputs the generated vector representations along with the label information to the recognition and classification circuit 1028.

At step S212, the recognition and classification circuit 1028 generates driver behavior classifiers/decision rules based on the vector representations and label information from the feature identification circuit 1026. In one example, the recognition and classification circuit 1028 may be a support vector machine (SVM).

In more detail, given the vector representations corresponding to different driver movements, the recognition and classification circuit 1028 learns or generates a set of decision rules (also referred to as classifiers) to assign vector representations of images to different action classes, where each decision rule classifies one concept, movement or action, such as a cellphone, waving a hand, holding a phone, etc. of a particular driver behavior. Each individual decision rule is used to make an independent decision, and then the final decision regarding whether a particular driver behavior is detected is a fuse or collaboration of all of the decision rules for a given driver behavior. The decision rules enable the recognition and classification circuit 1028 to recognize and classify driver behavior as will be discussed in more detail later with regard to FIG. 3.

The recognition and classification circuit 1028 may learn or generate decision rules using classification techniques, such as nearest neighbor classifier (e.g. K-mean classifier) or Support Vector Machines (SVM). In one example, SVM finds hyperplane that maximizes the margin between positive and negative examples. Because classification techniques such as these are well-known, a more detailed discussion is omitted.

The recognition and classification circuit 1028 combines or groups these relatively simple concepts, driver actions and/or movements together to generate a high-level feature representation for the given driver behavior. In one example, the high-level feature representation may be a hierarchy of driver actions or movements associated with static background information, HMM, high-level semantic representation of behavior, etc. The high-level feature representation may be referred to as driver behavior classification information.

In one example, the driver behavior classification information for a given driver behavior includes sequences of sub-actions or movements by the driver. The recognition and classification circuit 1028 utilizes high-level representations to model the ordering of the sub-actions to represent a particular driver behavior.

In the above-mentioned example, with a statistical HMM model the recognition and classification circuit 1028 may obtain a probability of each sub-action associated with the driver behavior, and the state transition probability from one sub-action to the next. The recognition and classification circuit 1028 may use the obtained probabilities to recognize and classify driver behavior. The temporal order of those sub-actions can be specified by a human operator, automatically or semi-automatically with human operator input.

The recognition and classification circuit 1028 stores the driver behavior classification information, including the sub-actions and the hierarchy of sub-actions associated with an identified driver behavior in a memory, such as memory 10280. In one example, the recognition and classification circuit 1028 stores the driver behavior classification information in association with a classification label for use in detecting driver behavior. The classification label may be obtained from the label information generated by the pre-processing circuit 1020. In one example, the driver behavior classification information may be stored in association with classification label in the form of a lookup table in a non-volatile memory, such as memory 10280.

A more specific example of the method shown in FIG. 2 will now be described with regard to training the driver behavior monitoring system to recognize and detect when the driver is talking on a cellphone. As discussed herein, this driver behavior may be referred to as cellphone distracted driver behavior. In this example, it is assumed that the driver behavior video content for the cellphone distracted driver behavior includes video of a driver performing the following actions: (i) moving his/her hand toward the phone; (ii) picking up the phone; (iii) moving the phone close to his/her ear; (iv) holding the phone at his/her ear; and (v) putting the phone down. However, example embodiments should not be limited to only this example.

Referring to FIGS. 1 and 2, at step S202 the camera 100 obtains driver behavior video content including the above-discussed video of the driver.

At step S203, the pre-processing circuit 1020 generates label information for the driver behavior video content. For example, the pre-processing circuit 1020 identifies the starting frame identifier for the frame in which the driver moves his/her hand toward the phone, and the ending frame identifier for the frame in which the driver puts the phone down after the call. The pre-processing circuit 1020 also associates a label for the driver behavior with the driver behavior video content. In this case, the label may be "driver using cellphone while driving" or "cellphone distracted driver behavior."

The pre-processing circuit 1020 outputs the driver behavior video content along with the label information to the frame sampling circuit 1021.

At step S204, the frame sampling circuit 1021 samples the driver behavior video content to obtain a set of representative image frames for the cellphone distracted driver behavior as discussed above. The frame sampling circuit 1021 outputs the set of representative image frames to the background subtraction circuit 1022. In this example, it is assumed that the set of representative image frames includes a frame corresponding to each of the driver movements (i) through (v) mentioned above; namely, (i) moving his/her hand toward the phone; (ii) picking up the phone; (iii) moving the phone close to his/her ear; (iv) holding the phone at his/her ear; and (v) putting the phone down.

At step S206, the background subtraction circuit 1022 subtracts the background portion from each representative image frame to generate a set of representative foreground images for the cellphone distracted driver behavior.

In this example, the representative foreground image includes the driver's body pose and relevant objects such as the driver's cellphone. The background subtraction circuit 1022 outputs the set of representative foreground images to the feature identification circuit 1026.

At step S210, the feature identification circuit 1026 generates a vector representation of each representative foreground image in the set of representative foreground images for the cellphone distracted driver behavior as discussed above. Once having built the visual vocabulary the feature identification circuit 1026 generates a vector representation for the cellphone distracted driver behavior in the form of a global histogram of visual word occurrences. The feature identification circuit 1026 outputs the vector representations of the representative foreground images in the set along with the label information to the recognition and classification circuit 1028.

At step S212, the recognition and classification circuit 1028 generates driver behavior classifiers for each of the above-mentioned movements (i) through (v) based on the vector representations from the feature identification circuit 1026.

In this example, the sequence of sub-actions or movements for the cellphone distracted driver behavior includes: (i) moving his/her hand toward the phone; (ii) picking up the phone; (iii) moving the phone close to his/her ear; (iv) holding the phone at his/her ear; and (v) putting the phone down. As mentioned above, the recognition and classification circuit 1028 utilizes high-level representations to model the ordering of the sub-actions to represent the cellphone distracted driver behavior.

In more detail with regard to this example, the recognition and classification circuit 1028 learns or generates a set of decision rules for recognizing the cellphone distracted driver behavior. In one example, the set of decision rules may include a decision rule corresponding to each of actions (i) through (v) discussed above. The decision rules are used to assign vector representations of images obtained during driver behavior detection to different action classes, where each decision rule classifies a concept (e.g., (i) moving his/her hand toward the phone; (ii) picking up the phone; (iii) moving the phone close to his/her ear; (iv) holding the phone at his/her ear; and (v) putting the phone down). Each of the generated decision rules is used to make an independent decision classifying the concept, and the final decision regarding whether the cellphone distracted driver behavior is detected is based on whether a majority or all of the decision rules. In one example, if all required concepts (e.g., (i) through (v)) are present in the vector representations, then the recognition and classification circuit 1028 detects cellphone distracted driver behavior.

The recognition and classification circuit 1028 stores the driver behavior classification information, including the sub-actions and the hierarchy of sub-actions associated with the cellphone distracted driver behavior in the memory 10280.

Figure 3:
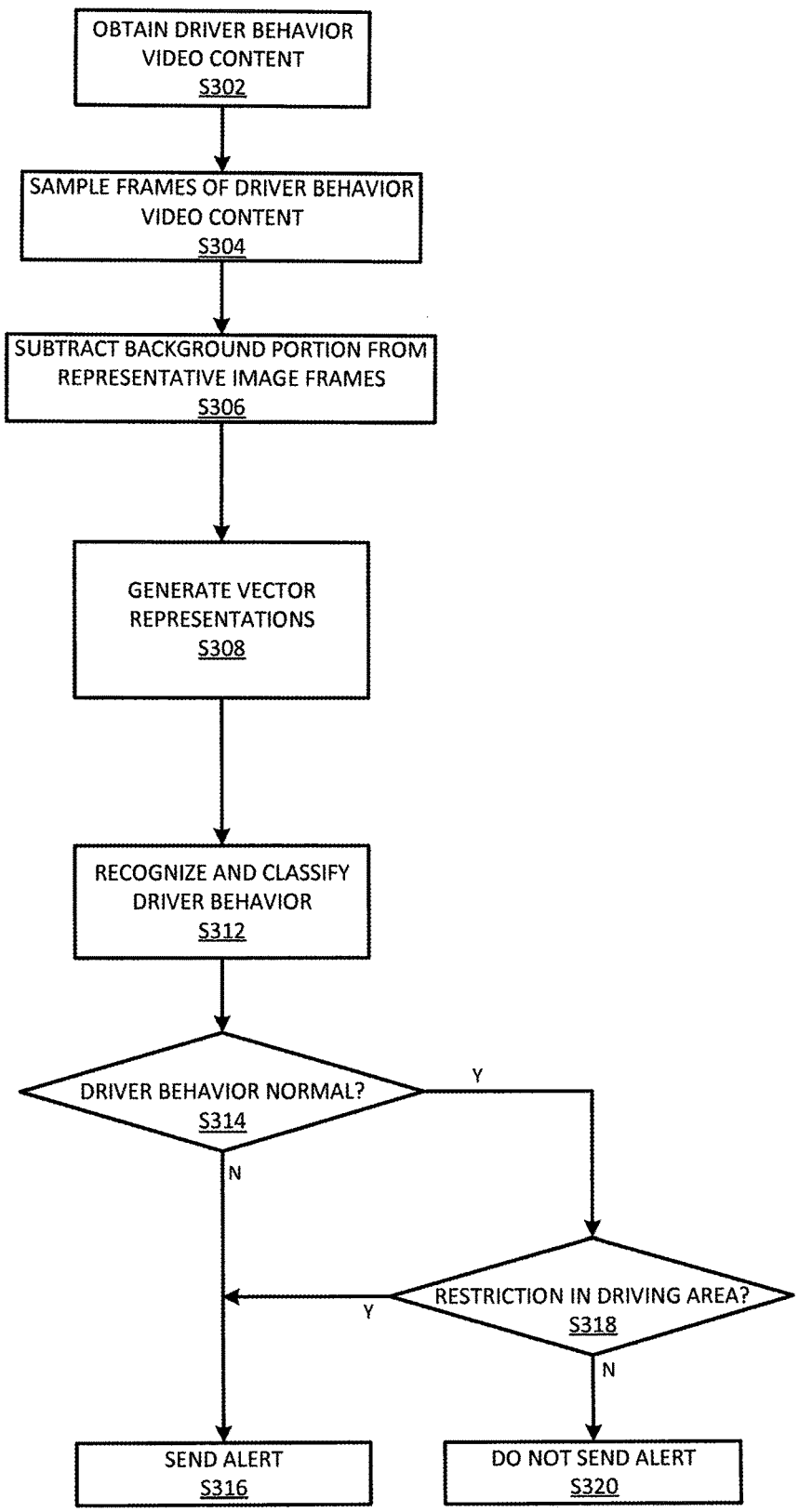
FIG. 3 is a flow chart illustrating a method for driver behavior monitoring according to an example embodiment.

FIG. 3 is a flow chart illustrating a method of driver behavior monitoring and alert according to an example embodiment. The method shown in FIG. 3 will be described with regard to the driver behavior monitoring system shown in FIG. 1 as trained according to the example embodiment shown in FIG. 2.

Referring to FIGS. 1 and 3, at step S302 the camera 100 obtains driver behavior video content at driving time. The driver behavior video content is the same and obtained in the same manner as that discussed above with regard to FIG. 2. The camera 100 outputs the obtained driver behavior video content to the image processing system 102.

At step S304, the frame sampling circuit 1021 samples the driver behavior video content in the same manner as discussed above with regard to step S204 in FIG. 2 to generate a set of representative image frames. The frame sampling circuit 1021 outputs the representative image frames to the background subtraction circuit 1022.

At step S306, the background subtraction circuit 1022 subtracts the background portion from each representative image frame to generate representative foreground images in the same manner as discussed above with regard to step S206. The background subtraction circuit 1022 outputs the representative foreground images to the feature identification circuit 1026.

At step S308, the feature identification circuit 1026 generates a vector representation of each representative foreground image in the set of representative foreground images in the same manner as discussed above with regard to step S210 in FIG. 2. The feature identification circuit 1026 outputs the vector representations to the recognition and classification circuit 1028.

At step S312, the recognition and classification circuit 1028 recognizes and classifies distracted and/or accident driver behavior (if present in the driver behavior video content) based on the vector representations generated at step S308 and the driver behavior classification information (e.g., including decision rules and label information) stored in the memory 10280. The recognition and classification circuit 1028 then notifies the driver alert system 104 of the recognized driver behavior. In one example, the recognition and classification circuit 1028 outputs a notification signal to the driver alert system 104.

In one example, the recognition and classification circuit 1028 assigns or classifies the vector representations obtained at step S308 to different action classes using the decision rules discussed above, where each decision rule classifies a concept. As discussed above, each of the generated decision rules is used to make an independent decision classifying one or more vector representations. The recognition and classification circuit 1028 then determines whether distracted and/or accident driver behavior is present if all required concepts (e.g., actions, objects, etc.) for a particular driver behavior are present in the vector representations. The recognition and classification circuit 1028 also classifies the driver behavior as the detected driver behavior based on the stored label information.

In connection with the cellphone distracted driver behavior discussed above, for example, the recognition and classification circuit 1028 may use the set of decision rules to determine whether the driver behavior video content includes the following actions by the driver: (i) moving his/her hand toward the phone; (ii) picking up the phone; (iii) moving the phone close to his/her ear; (iv) holding the phone at his/her ear; and (v) putting the phone down. In this example, if the recognition and classification circuit 1028 determines that all of these concepts are present in the vector representations, then the recognition and classification circuit 1028 detects distracted driver behavior and classifies the behavior as cellphone distracted driver behavior.

Returning to FIG. 3, as mentioned above when distracted and/or accident driver behavior is detected, the recognition and classification circuit 1028 notifies the driver alert system 104 of the recognized driver behavior. In one example, the recognition and classification circuit 1028 outputs a notification signal to the driver alert system 104. The notification signal may be indicative of the recognized driver behavior.

The driver alert system 104 receives the notification of the recognized driver behavior, and determines whether to issue an alert based on the recognized driver behavior. In so doing, the driver alert system 104 selectively outputs an alert based on the notification signal.

In one example, at step S314 upon receiving the notification signal, the driver alert system 104 determines whether the recognized driver behavior is normal based on speed information from the speed sensor 106. For example, if the recognized driver behavior is the cellphone distracted driver behavior discussed above, then the driver alert system 104 may determine that this behavior is normal if the speed information from the speed sensor 106 indicates that the vehicle is not moving (e.g., 0 MPH). On the other hand, if the speed information from the speed sensor 106 indicates that the vehicle is in motion, then the driver alert system 104 determines that the cellphone distracted driver behavior is not normal.

If the driver alert system 104 determines that the recognized driver behavior is normal, then at step S318 the driver alert system 104 determines whether the vehicle is in a location where the recognized driver behavior is restricted based on location information from the GPS receiver 108. For example, in some states it is unlawful to use a cellphone while driving without hands free operation. If the recognized driver behavior is the above-discussed cellphone distracted driver behavior, and location information from the GPS receiver 108 indicates that the vehicle is in an area in which such behavior is unlawful, then the driver alert system 104 determines that the recognized driver behavior is restricted in the driving area.

Still referring to step S318, if the driver alert system 104 determines that the vehicle is located in an area in which the recognized driver behavior is restricted, then the driver alert system 104 outputs an alert at step S316.

Returning to step S318, if the driver alert system 104 determines that the recognized driver behavior is not restricted, then the driver alert system 104 does not send any alert to the driver or otherwise at step S320.

According to at least some example embodiments, the driver alert output from the driver alert system 104 may depend on the recognized driver behavior. In one example, the driver alert system 104 may output a visual or audible alert to notify the driver that the recognized driver behavior is restricted based on the vehicle's current location. In another example, in the event of accident behavior (e.g., impact of head on steering wheel, airbag deployment, etc.) the driver alert system 104 may notify emergency responders of the accident behavior and the location of the vehicle. The driver alert system 104 may also alert other drivers nearby of the accident behavior so that they can reroute and/or be cautious when approaching the area by issuing a multicast alert via wireless communication multicast services, which are well-known.

Returning to step S314 in FIG. 3, if the driver alert system 104 determines that the recognized driver behavior is not normal, then at step S316 the driver alert system outputs an alert as discussed above.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A driver behavior monitoring system for a vehicle, the system comprising:
   a frame sampling circuit configured to generate a set of representative image frames by sampling driver behavior video content;
   a feature identification circuit configured to generate a vector representation of a foreground portion of each representative image frame in the set of representative image frames, each foreground portion including features relevant for recognizing and classifying driver behavior as distracted or accident behavior, accident behavior is behavior indicating that an accident has occurred;
   a recognition and classification circuit configured to dynamically generate, based on the vector representations, a first set of decision rules for recognizing and classifying the driver behavior as distracted behavior and a second set of decision rules for recognizing and classifying the driver behavior as accident behavior, each of the first and second sets of decision rules corresponding to a different concept, movement or action associated with the distracted or accident behavior, the recognition and classification circuit being further configured to distinguish between distracted behavior and accident behavior based on the dynamically generated decision rules; and
   a driver alert system configured to
      determine whether recognized and classified driver behavior is allowed based on speed information associated with the vehicle and location information indicating whether the vehicle is in a restricted driving area, and
      output an alert in response to determining that the recognized and classified driver behavior is not allowed.

2. The driver behavior monitoring system of claim 1, further comprising:
   a camera configured to obtain the driver behavior video content.

3. The driver behavior monitoring system of claim 1, further comprising:
a background subtraction circuit configured to remove a background portion of each representative image frame.

4. The driver behavior monitoring system of claim 1, wherein the feature identification circuit is further configured to,
perform feature detection of the foreground portion of each representative image frame,
compute feature descriptors associated with each representative image frame based on the detected features, and
generate the vector representations based on the computed feature descriptors.

5. The driver behavior monitoring system of claim 4, wherein the detected features capture spatial and temporal characteristics of movement of a driver around space and time salient features.

6. The driver behavior monitoring system of claim 1, wherein the vector representations represent both static and dynamic features in the representative image frames.

7. The driver behavior monitoring system of claim 6, wherein the feature identification circuit is configured to identify the dynamic features by tracking positions of static features between representative image frames in the set of representative image frames.

8. The driver behavior monitoring system of claim 1, wherein the driver behavior is characterized by a plurality of sub-actions or movements by a driver, and each of the first and second sets of decision rules corresponds to a sub-action or movement among the plurality of sub-actions or movements.

9. The driver behavior monitoring system of claim 1, wherein the driver alert system is configured to determine whether recognized and classified driver behavior is allowed based on determining that the vehicle is
(i) not moving, or
(ii) located in a region where the recognized and classified driver behavior is not prohibited.

10. A method for monitoring behavior of a driver of a vehicle, the method comprising:
generating a set of representative image frames by sampling driver behavior video content;
generating a vector representation of a foreground portion of each representative image frame in the set of representative image frames, each foreground portion including features relevant for recognizing and classifying driver behavior as distracted or accident behavior, accident behavior is behavior indicating that an accident has occurred;
dynamically generating, based on the vector representations, a first set of decision rules for recognizing and classifying the driver behavior as distracted behavior and a second set of decision rules for recognizing and classifying the driver behavior as accident behavior, each of the first and second sets of decision rules corresponding to a different concept, movement or action associated with the distracted or accident behavior;
distinguishing between distracted behavior and accident behavior based on the decision rules;
determining whether recognized and classified driver behavior is allowed based on speed information associated with the vehicle and location information indicating whether the vehicle is in a restricted driving area; and
outputting an alert in response to determining that the recognized and classified driver behavior is not allowed.

11. The method of claim 10, wherein the driver behavior is characterized by a plurality of sub-actions or movements by the driver, and each of the first and second sets of decision rules corresponds to a sub-action or movement among the plurality of sub-actions or movements.

12. A driver behavior monitoring system for a vehicle, the system comprising:
a frame sampling circuit configured to generate a set of representative image frames by sampling driver behavior video content;
a feature identification circuit configured to generate a vector representation of a foreground portion of each representative image frame in the set of representative image frames, each foreground portion including features relevant for recognizing and classifying driver behavior as distracted or accident behavior, accident behavior is behavior indicating that an accident has occurred;
a recognition and classification circuit configured to recognize and classify the driver behavior as distracted behavior or accident behavior based on the vector representations, a dynamically generated first set of decision rules for recognizing and classifying the driver behavior as the distracted behavior, and a dynamically generated second set of decision rules for recognizing and classifying the driver behavior as the accident behavior, each of the first and second sets of decision rules corresponding to a different concept, movement or action associated with the distracted or accident behavior, the recognition and classification circuit being further configured to distinguish between distracted behavior and accident behavior based on the dynamically generated decision rules, and to output a notification signal corresponding to the recognized and classified driver behavior; and
a driver alert system configured to
determine whether the recognized and classified driver behavior is allowed based on speed information associated with the vehicle and location information indicating whether the vehicle is in a restricted driving area, and
output an alert based on the notification signal and in response to determining that recognized and classified driver behavior is not allowed.

13. The driver behavior monitoring system of claim 12, further comprising:
a camera configured to obtain the driver behavior video content at driving time.

14. The driver behavior monitoring system of claim 12, further comprising:
a background subtraction circuit configured to remove a background portion from each representative image frame.

15. The driver behavior monitoring system of claim 12, wherein the driver behavior is characterized by a plurality of sub-actions or movements by a driver, and each of the decision rules corresponds to a sub-action or movement among the plurality of sub-actions or movements.

16. The driver behavior monitoring system of claim 12, further comprising:
a global positioning receiver configured to output the location information to the driver alert system.

17. The driver behavior monitoring system of claim 12, further comprising:
  a speed sensor configured to output the speed information to the driver alert system.

18. The driver behavior monitoring system of claim 12, wherein the driver alert system is configured to output the alert to at least one of a driver of the vehicle, emergency responders and other nearby drivers.

\* \* \* \* \*